United States Patent [19]

Welschof

[11] Patent Number: 5,531,643
[45] Date of Patent: Jul. 2, 1996

[54] CONSTANT VELOCITY UNIVERSAL BALL JOINT

[75] Inventor: Hans-Heinrich Welschof, Rodenbach, Germany

[73] Assignee: GKN Automotive AG, Lohmar, Germany

[21] Appl. No.: 87,984

[22] Filed: Jul. 7, 1993

[30]     Foreign Application Priority Data

Jul. 7, 1992 [DE] Germany .................. 42 22 205.2

[51] Int. Cl.⁶ ............................................. F16D 3/223
[52] U.S. Cl. ............................................. 464/144; 464/906
[58] Field of Search ........................... 464/144, 145, 464/906

[56]            References Cited

U.S. PATENT DOCUMENTS

| 3,133,431 | 5/1964 | Zech | 464/906 |
|---|---|---|---|
| 3,176,477 | 4/1965 | Mazziotti | 464/145 |
| 3,370,441 | 2/1968 | Aucktor . | |
| 3,614,397 | 2/1970 | Okoshi | 464/144 |
| 3,879,960 | 4/1975 | Welschof et al. | 464/145 |
| 3,899,898 | 8/1975 | Takahahi et al. | 464/144 |

FOREIGN PATENT DOCUMENTS

| 1368597 | 6/1964 | France . |
|---|---|---|
| 1925052 | 9/1962 | Germany . |
| 6606865 | 6/1965 | Germany . |
| 1931446 | 1/1970 | Germany . |
| 2511447 | 3/1976 | Germany . |
| 958888 | 5/1964 | United Kingdom . |
| 962455 | 7/1964 | United Kingdom . |

*Primary Examiner*—Daniel P. Stodola
*Assistant Examiner*—Eileen A. Dunn
*Attorney, Agent, or Firm*—Harness, Dickey & Pierce

[57]            ABSTRACT

A constant velocity universal ball joint has the ball tracks in the outer joint part (11, 31, 51, 71) and in the inner joint part (13, 33, 53, 73) designed in such a way that, with coaxial axes ($A_{11}, \ldots; A_{13}, \ldots$) and corresponding central planes ($E_{11}, \ldots; E_{13}, \ldots$) of the outer and inner joint parts (11, 31, $\ldots$; 13, 33, $\ldots$) on both sides of the respective central planes ($E_{11}, \ldots; E_{13}, \ldots$), in a radial projection on to the axes ($A_{11}, \ldots; A_{13} \ldots$), they form with their center lines ($M_{11}, \ldots; M_{13} \ldots$) an angle relative to one another which deviates from zero and which decreases towards their axial ends.

12 Claims, 4 Drawing Sheets

CONSTANT VELOCITY UNIVERSAL BALL JOINT

BACKGROUND AND BRIEF DESCRIPTION OF THE INVENTION

The invention relates to a constant velocity universal ball joint having an outer joint part with circumferentially distributed, substantially longitudinally extending inner ball tracks; an inner joint part with circumferentially distributed, substantially longitudinally extending outer ball tracks, the ball tracks in the outer joint part and inner joint part being arranged in pairs and positioned opposite one another while jointly accommodating a torque transmitting ball and participating or cooperating in controlling the balls towards and onto the plane which bisects the angle formed by the rotational axes of the outer joint part and inner joint part at articulation of the joint parts relative to one another, i.e. the angle-bisecting plane. The joint further has a cage which, in circumferentially distributed windows holds the balls in a common plane and guides them onto the angle-bisecting plane when the rotational axes of the outer joint part and inner joint part are articulated relative to one another.

The joints may be fixed joints which only permit the axes to be articulated but which do not allow the central planes of the outer and inner joint parts to be axially displaced relative to one another. However, the joints also include plunging joints where a relative displacement of the central planes of the outer and inner joint parts is possible.

Apart from directly controlling the balls so as to cause them to move onto the angle-bisecting plane by designing the tracks accordingly, as mentioned, it is in addition also possible to control the balls indirectly, by means of the cage, so as to cause them to move onto said plane. This assumes that the cage guiding faces at the outer joint part and at the inner joint part are designed in such a way—especially by axially offsetting their centers of sphere—that upon articulation of the axes of the outer and inner joint parts relative to one another, control forces are introduced directly into the cage. However, this type of control does not necessarily exist with the joints concerned here.

With fixed joints of the type as a rule and with plunging joints of the type as a matter of necessity, control of the balls by the tracks is effected in such a way that in the longitudinal direction, the tracks deviate slightly from the absolutely parallel design such that the tracks in the outer joint part and/or in the inner joint part, when projected onto the rotational axes, form opposed angles therewith, so that any two tracks facing one another and jointly accommodating a ball intersect one another. As a rule, the angles involved are opposed angles of identical size formed by cooperating tracks in the outer joint part and inner joint part. If with such a joint the rotational axes of the two joint parts are articulated relative to one another, the point of intersection of the tracks where approximately the ball is held, moves in the axial direction with reference to each of the two joint parts and thus guides the cage onto the angle-bisecting plane. Because the cage has been moved to the angle-bisecting plane and because, as a result, it is articulated relative to both the outer joint part and the inner joint part, it is due to simple geometric conditions that there takes place a relative circumferential movement of the balls relative to the cage during said movements. Therefore, the cage windows holding the balls in a common plane have to have a certain circumferential length. The greater the specific articulation angle of a joint, the greater the necessary circumferential length of the cage window.

As a result, the webs remaining between the windows are reduced in width, so that the fracture strength of the cage decreases.

With fixed joints of the type, the action of controlling the balls onto the angle-bisecting plane may also, when viewed in a longitudinal section, additionally be based on an angle of intersection of the track center lines of the tracks which are associated relative to one another and which jointly accommodate a ball. In this case, the track center lines, in the longitudinal section, are designed to be mirror-image symmetrical relative to the central plane and extend, for example, in the form of circular arches whose centers of curvature are axially offset in the direction opposite to said central plane. For the reasons already mentioned above, the cage windows also have to have a certain circumferential length which weakens the cage. Furthermore, there exists a problem in that an adequate track depth cannot be ensured in the axial end regions of such joints, so that when the joint is articulated and with the balls having moved into the axial end regions, the tracks are capable of accommodating limited circumferential forces only, which means that corresponding forces additionally have to be accommodated by the cage. As a result, the strength limit of the cage is again disadvantageously reduced.

It is the object of the present invention to improve a constant velocity universal ball joint of the initially mentioned type in such a way that the forces applied to the ball cage are reduced and that, as a result, the load bearing capacity of the cage under torque is increased when the joint is in an articulated condition.

The objective is achieved in that the ball tracks in the outer joint part and inner joint part are designed in such a way that, with coaxial axes and corresponding central planes of the outer and inner joint parts, in a radial projection onto the axes, they form with their center lines an angle relative to one another on both sides of the respective central planes, which deviates from zero and which decreases towards their axial ends.

With reference to fixed joints, the relative positions of the axes and central planes of the outer and inner joint parts mentioned above define the aligned joint in two ways, whereas with reference to plunging joints, they define the aligned joint in the central position of the possible plunging distance.

This means that with an articulated joint, the tracks especially in the articulation plane in the region of large angles no longer apply any control forces to the balls as soon as they have reached the nearly or completely parallel end portions, which means that the control forces are reduced and that, overall, the cage is subject to lower forces. In the tracks positioned outside the articulation plane, the track control angle subjecting the respective balls to control forces is always relatively large.

In the case of plunging joints, when in operation, a long plunging distance, as a rule, corresponds to a large articulation angle so that even with long plunging distances, the function of controlling the cage onto half the plunging distance is always ensured in spite of a decreasing control angle.

According to a first preferred embodiment which is easy to manufacture from a production or technical point of view, the central portions of the tracks of each of the two joint parts are inclined in the same direction, i.e. they extend essentially parallel relative to one another in each joint part, respectively.

According to a second preferred embodiment, the tracks of each of the two joint parts are arranged across the circumference so as to extend alternately at different angles of inclination. This improves the effectiveness of the control mechanisms.

As far as the track depth is concerned, the tracks may be designed in such a way that, like threads, they extend along their entire length at a constant distance from the respective rotational axis, with the end portions being axis-parallel. Alternately, it is also possible to design the tracks as inclined tangents at a circle positioned in the central plane of the joint, in which case the respective distance from the rotational axis is not constant, whereas the end portions are again parallel to the rotational axis.

In a radial projection, the tracks may be formed of straight portions. This may be advantageous from a production or technical point of view. However, it is also possible to provide for continuous changes in angle which lead to correspondingly continuous changes in the load conditions at the cage, thereby avoiding sudden load peaks. In this case, the invention permits several types of curves starting from the central plane, i.e. curves which, for example, follow hyperbolic, parabolic, elliptical or circular functions.

Preferred embodiments of the invention are illustrated in the drawings which drawings are described below.

BRIEF DESCRIPTION OF THE DRAWINGS

FIG. 1a is a longitudinal section through a fixed joint in accordance with the invention whose ball tracks are circular-arched-shaped in the longitudinal section and in the case of which, by way of example, a ball track is illustrated by dashed lines in a radial view and located on the circumference of the inner joint part positioned behind the plane of intersection.

FIG. 1b is a longitudinal section through a fixed joint in accordance with the invention as shown in FIG. 1a, in the case of which a central region of the inner joint part is broken away and where, by way of example, there is shown a ball track (in a radial view) cooperating with the ball track according to FIG. 1a.

FIG. 2b is a longitudinal section through a fixed joint in accordance with the invention as shown in FIG. 2a, in the case of which a central region of the inner joint part is broken away and where, by way of example, there is shown a ball track (in a radial view) cooperating with the ball track according to FIG. 2a.

FIG. 3b is a longitudinal section through a fixed joint in accordance with the invention as shown in FIG. 3a, in the case of which a central region of the inner joint part is broken away and where, by way of example, there is shown a ball track (in a radial view) cooperating with the ball track according to FIG. 3a.

FIG. 4b is a longitudinal section through a plunging joint in accordance with the invention in the case of which a central region of the inner joint part is broken way and where, by way of example, there is shown a ball track (in a radial view) cooperating with the ball track according to FIG. 4a.

DETAILED DESCRIPTION OF THE PREFERRED EMBODIMENTS

Figures 1A, 1B:
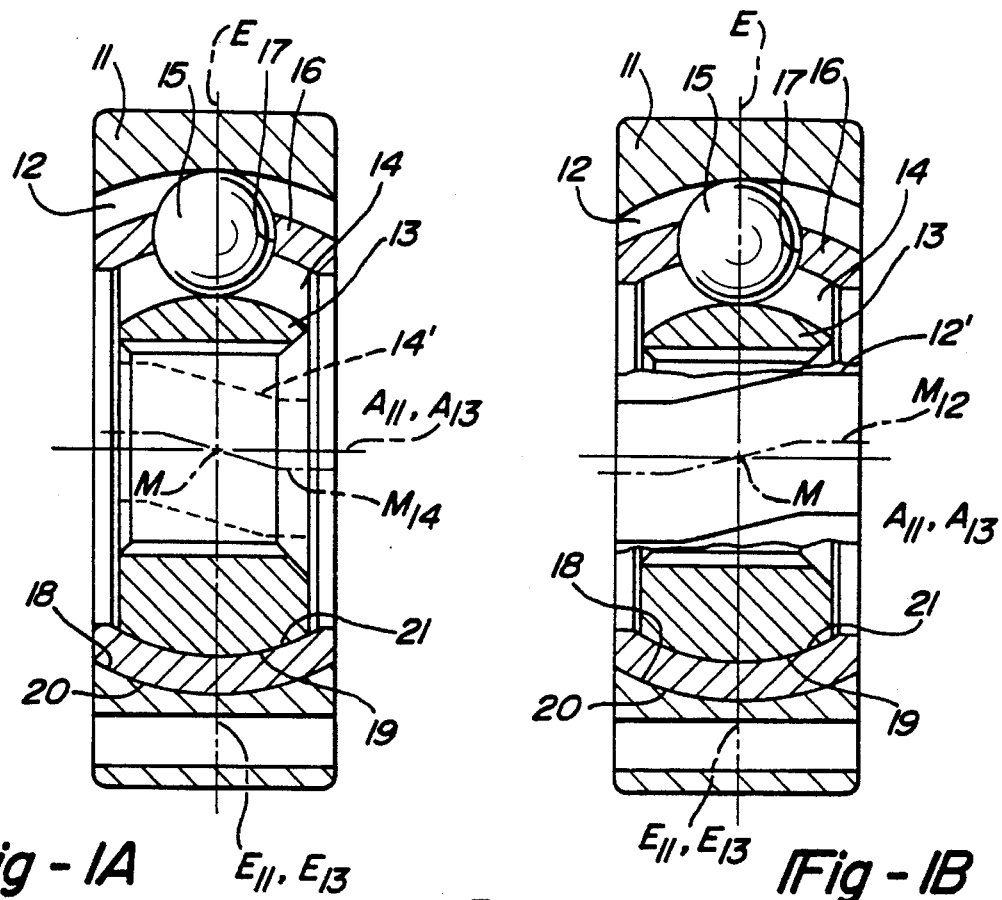

FIGS. 1a and 1b which, below, will be described jointly, each show a fixed joint indicating the following features: an outer joint part 11 with circumferentially distributed inner ball tracks 12, the axis of the outer joint part has been given the reference symbol $A_{11}$ and the central plane the reference symbol $E_{11}$; an inner joint part 13 arranged coaxially relative thereto and having outer ball tracks 14; the axis of the inner joint part has been given the reference symbol $A_{13}$ and the central plane the reference symbol $E_{13}$; the ball tracks 12, 14 are associated with one another in the form of pairs and, in each case, jointly accommodate a torque transmitting ball 15. Said balls are held in a plane E by a ball cage 16 arranged between the outer joint part and inner joint part and comprising windows 17 arranged in the tracks circumferentially distributed accordingly. The cage 16, via its outer and inner faces, is guided in inner spherical guiding faces 18 of the outer joint part and on outer spherical guiding faces 19 of the inner joint part, which are each interrupted by the tracks. The corresponding counter faces 20 on the outside of the cage and 21 on the inside of the cage also have the form of spherical portions.

As illustrated in the upper halves of the Figures, the tracks, if viewed in the longitudinal section, extend in the form of circular arches around the joint center M which is located in the point of intersection of the axes $A_{11}$, $A_{13}$ of the outer joint part and inner joint part which extend coaxially when the joint is in the extended condition, and in the central plane E predetermined by the ball centers. The center lines $M_{11}$, $M_{13}$ of the ball tracks extend through the ball center parallel to the track base and are not shown in the longitudinal section.

FIG. 1a, in the region of the axes, indicates by dashed lines an outer track 14' on the reverse of the inner joint part, which track demonstrates that the tracks do not extend exactly in the longitudinal direction. It can be seen that the center line $M_{14}$ of said track, in the radial projection, includes three straight portions and that it intersects the corresponding axis $A_{13}$ of the inner joint part in the central plane $E_{13}$ only while forming therewith opposed angles on both sides, which angles deviate from zero but which become zero at the ends of the tracks.

In FIG. 1b, a central part of the inner joint part 13 containing the above-mentioned track 14' is completely broken away. In a radial view it is possible to see an inner track 12' in the outer joint part 11. The center line $M_{12}$ of said track 12', in a radial projection, also includes three straight line portions and again intersects the corresponding axis $A_{11}$ of the outer joint part in the central plane $E_{11}$ only and, in a radial projection, forms therewith opposed angles on both sides, which angles deviate from zero. In this case, too, the angle between the center line $M_{12}$ and the axis $A_{11}$ becomes zero at the axial ends of the tracks.

Figure 2A:
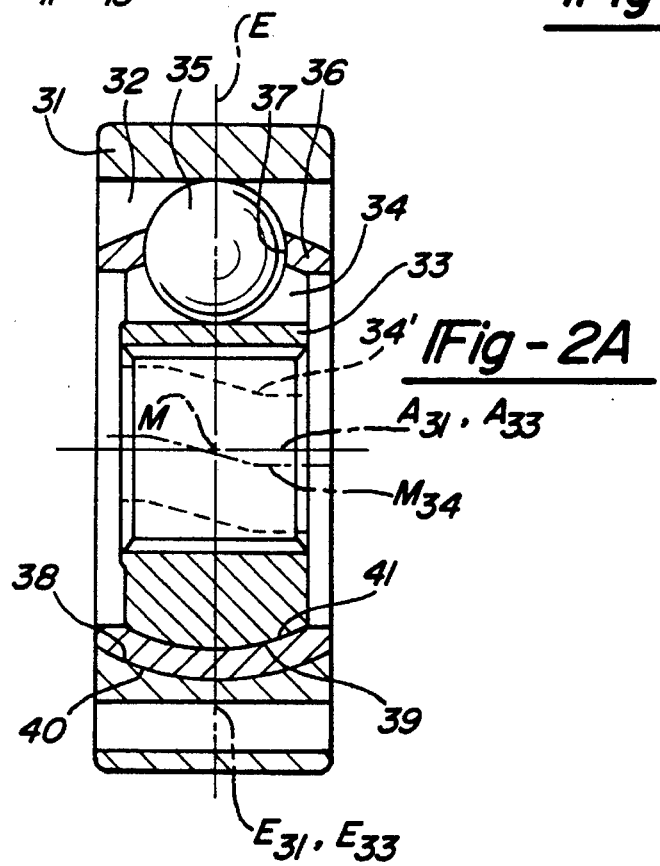
FIG. 2a is a longitudinal section through a fixed joint in accordance with the invention whose ball tracks, in the longitudinal section, extend in an axis-parallel way and in the case of which, by way of example, a ball track is illustrated by dashed lines in a radial view and located on the circumference of the inner joint part positioned behind the plane of intersection.
Figure 2B:
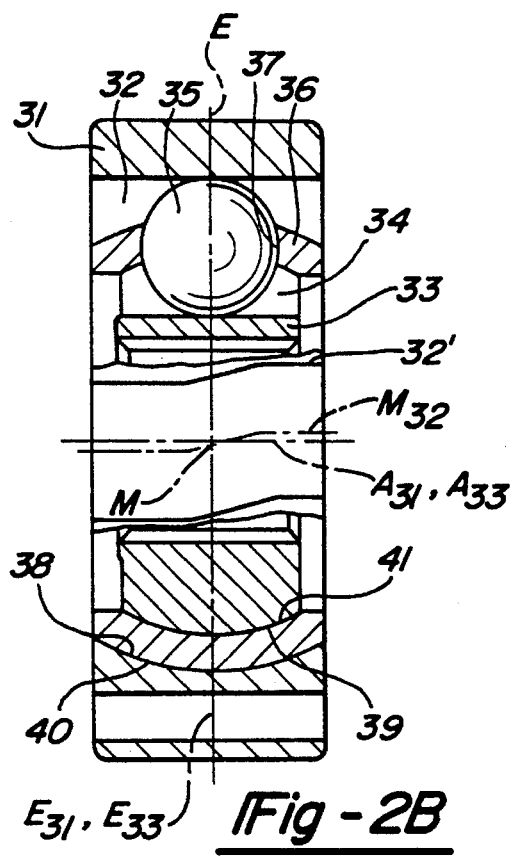

FIGS. 2a and 2b which, below, will be described jointly, each show a fixed joint indicating the following details: an outer joint part 31 with circumferentially distributed inner ball tracks 32; the axis of the outer joint part has been given the reference symbol $A_{31}$ and the central plane the reference symbol $E_{31}$; an inner joint part 33 arranged coaxially thereto and having outer ball tracks 34; the axis of the inner joint part has been given the reference symbol $A_{33}$ and the central plane the reference symbol $E_{33}$; the ball tracks 32, 34 are associated with one another in the form of pairs and, in each case, jointly accommodate a torque transmitting ball 35. Said balls are held in a plane E by a ball cage 36 arranged between the outer joint part and the inner joint part and comprising windows 37 arranged in the tracks circumferentially distributed accordingly. The cage 36, via its outer and inner faces, is guided in inner spherical guiding faces 38 in the outer joint part and on outer spherical guiding faces 39 of the inner joint part, which are each interrupted by the tracks. The corresponding counter faces 40 on the outside of the cage and 41 on the inside of the cage also have the form of spherical portions.

As illustrated in the upper halves of the Figures, the tracks, if viewed in the longitudinal section, extend in the form of straight lines arranged parallel to the axes $A_{31}$ $A_{33}$ of the outer and inner joint parts, which extend coaxially when the joint is in the extended condition. The center lines $M_{31}$, $M_{33}$ of the tracks extend parallel to the track base through the ball centers and are not shown in the longitudinal section.

FIG. 2a, in the region of the axes, indicates by dashed lines an outer track 34' on the reverse of the inner joint part, which track demonstrates that the tracks do not extend exactly in the longitudinal direction. It can be seen that the center line $M_{34}$ of said track, in the radial projection, includes three straight line portions and that it intersects the corresponding axis $A_{33}$ of the inner joint part in the central plane $E_{33}$ only, while forming therewith opposed angles on both sides, which angles deviate from zero but which become zero at the ends of the tracks.

In FIG. 2b, a central portion of the inner joint part containing the above-mentioned track 34' is broken away completely. In a radial view it is possible to see an inner track 32' in the outer joint part 31. Its center line $M_{32}$ again, in the radial projection, includes three straight portions and, again, intersects the corresponding axis $A_{31}$ of the outer joint part in the central plane only $E_{31}$ and, in a radial projection, forms therewith opposed angles on both sides, which angles deviate from zero. In this case, too, the angle between the center line $M_{32}$ and the axis $A_{31}$ becomes zero at the axial ends of the tracks.

Figure 3A:
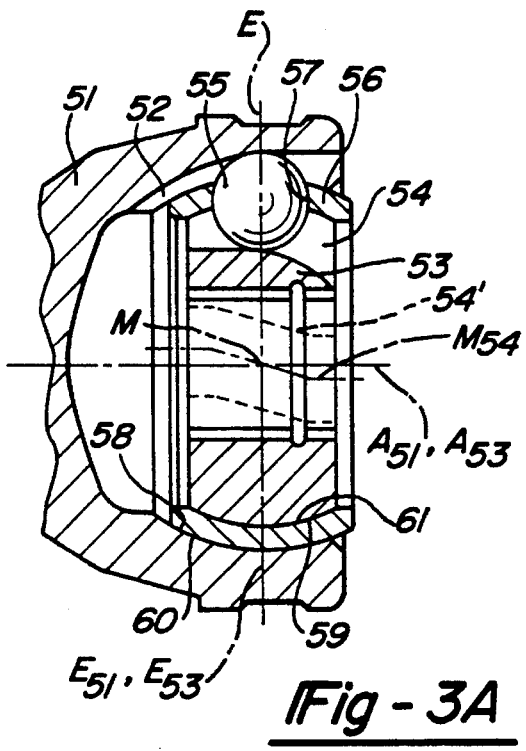
FIG. 3a is a longitudinal section through a fixed joint in accordance with the invention whose ball tracks, in the longitudinal section, are undercut-free towards the one open end of the outer joint part and in the case of which, by way of example, a ball track is illustrated by dashed lines in a radial view and located on the circumference of the inner joint part positioned behind the plane of intersection.
Figure 3B:
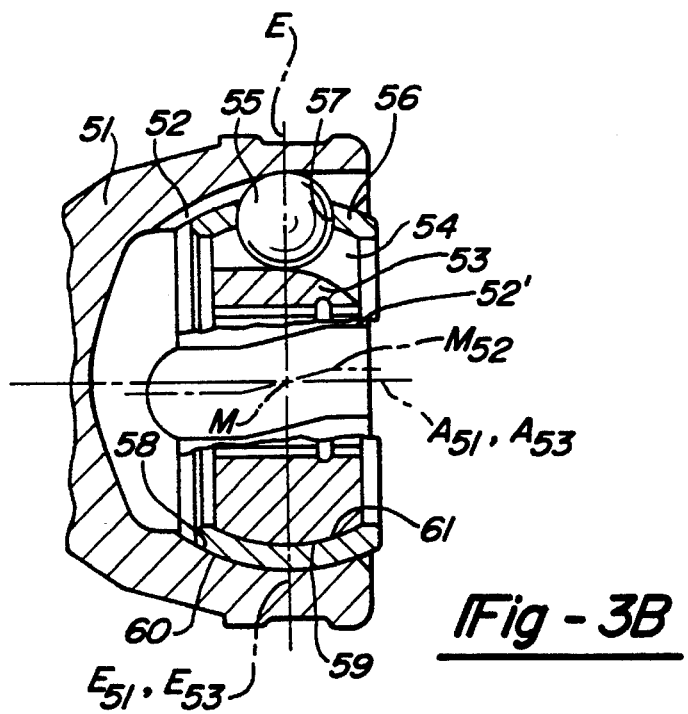

FIGS. 3a and 3b which, below, will be described jointly, each show a fixed joint indicating the following details; an outer joint part 51 with circumferentially distributed inner ball tracks 52; the axis of the outer joint part has been given the reference symbol $A_{51}$ and the central plane the reference symbol $E_{51}$; an inner joint part 53 arranged coaxially thereto and having outer ball tracks 54; the axis of the inner joint part has been given the reference symbol $A_{53}$ and the central plane the reference symbol $E_{53}$. The ball tracks 52, 54 are associated with one another in the form of pairs and, in each case, jointly accommodate a torque transmitting ball 55. Said balls are held in a plane E by a ball cage 56 arranged between the outer joint part and the inner joint part and comprising windows 57 arranged in the tracks circumferentially distributed accordingly. The cage 56, via its outer and inner faces, is guided in inner spherical guiding faces 58 in the outer joint part and on outer spherical guiding faces 59 of the inner joint part, which are each interrupted by the tracks. The corresponding counter faces 60 on the outside of the cage and 61 on the inside of the cage also have the form of spherical portions.

As illustrated in the upper halves of the Figures, the tracks, if viewed in the longitudinal section, extend in the form of circular arches around the joint center M, followed by straight lines extending parallel to the axes $A_{51}$, $A_{53}$ of the outer joint part and inner joint part, which are positioned coaxially when the joint is in the extended position. The center M of the central plane is positioned in E, predetermined by the ball centers. The center lines M of the tracks extend parallel to $M_{51}$, $M_{53}$ the track base, through the ball centers, and are not shown in the longitudinal section.

FIG. 3a, in the region of the axes, indicates by dashed lines an outer track 54' on the reverse of the inner joint part, which track demonstrates that the tracks do not extend exactly in the longitudinal direction. It can be seen that the center line $M_{54}$ of this track, in a radial projection, includes three straight portions and that it intersects the corresponding axis $A_{53}$ of the inner joint part in the central plane $E_{53}$ only while forming therewith opposed angles on both sides, which angles deviate from zero but which become zero at the ends of the tracks.

In FIG. 3b, a central portion of the inner joint part 53 containing the above-mentioned track 54' is broken away completely. In a radial view it is possible to identify an inner track 52' in the outer joint part 51. Its center line $M_{52}$, in a radial projection, again includes three straight portions and again intersects the corresponding axis $A_{51}$ of the outer joint part in the central plane $E_{51}$ only and, in the radial projection, forms therewith opposed angles on both sides, which angles deviate from zero; in this case, too, the angle between the center line $M_{52}$ and the axis $A_{51}$ becomes zero at the axial ends of the tracks.

Figure 4A:
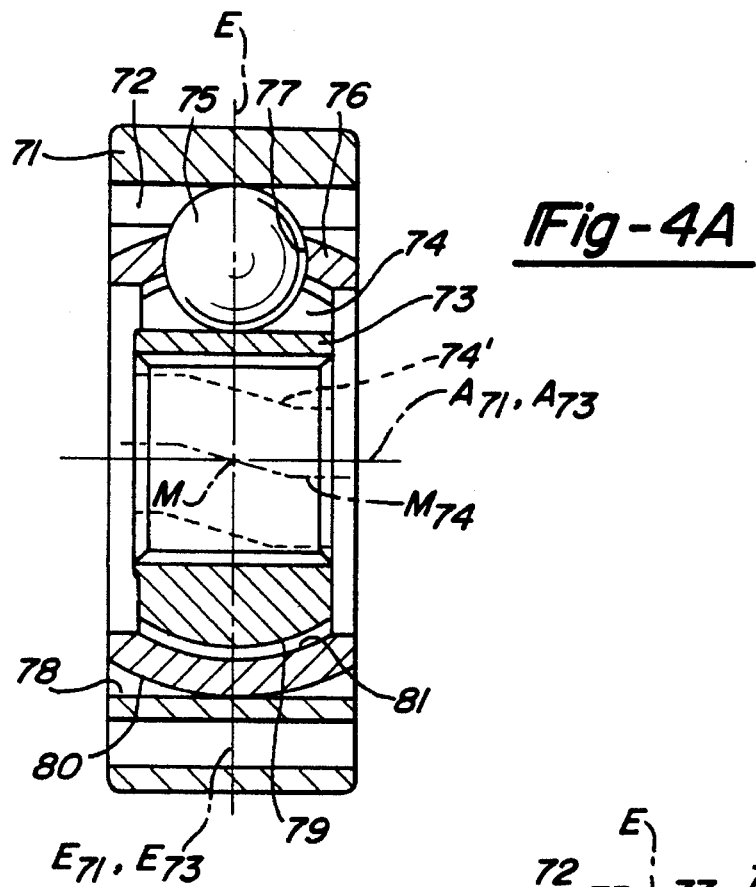
FIG. 4a is a longitudinal section through a plunging joint in accordance with the invention whose ball tracks, in the longitudinal section, extend in an axis-parallel way and in the case of which, by way of example, a ball track is illustrated in dashed lines in a radial view and located on the circumference of the inner joint part positioned behind the plane of intersection.
Figure 4B:
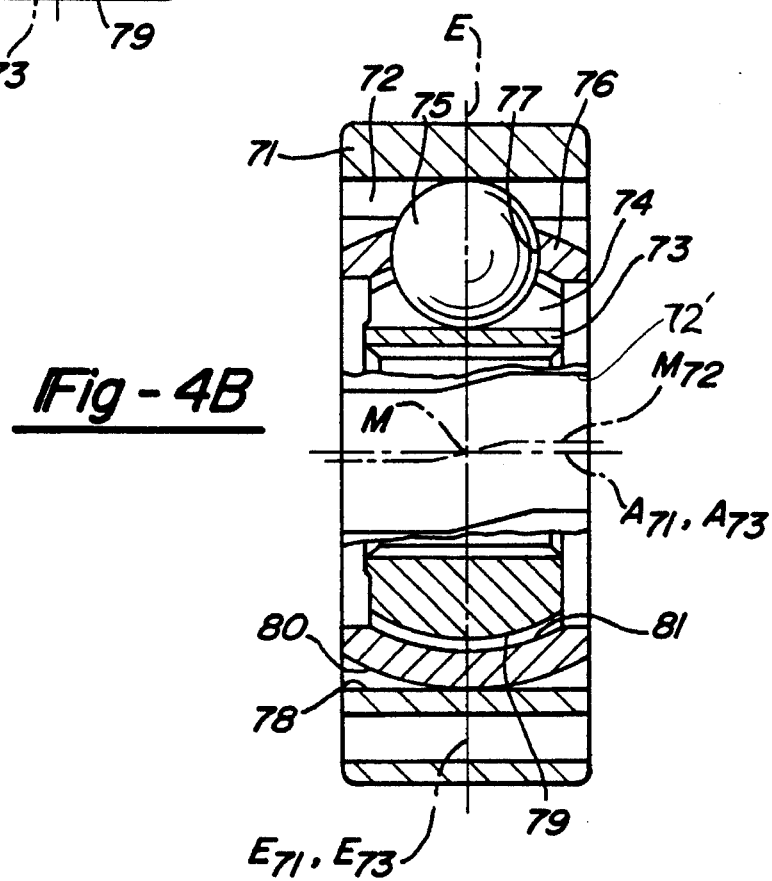

FIGS. 4a and 4b which, below, will be described jointly, each show a plunging joint indicating the following details: an outer joint part 71 with circumferentially distributed inner ball tracks 72; the axis of the outer joint part has been given the reference symbol $A_{71}$ and the central plane the reference symbol $E_{71}$; an inner joint part 73 arranged coaxially thereto and having outer ball tracks 74; the axis of the inner joint part has been given the reference symbol $A_{73}$ and the central plane the reference symbol $E_{73}$ the ball tracks 72, 74 are associated with one another in the form of pairs and, in each case, jointly accommodate a torque transmitting ball 75. Said balls are guided in a plane E by a ball cage 76 arranged between the outer joint part and the inner joint part and comprising windows 77 arranged in tracks circumferentially distributed accordingly. The cage 76, via its outer spherical face 80, is held and guided in an inner cylindrical guiding face 78 in the outer joint part. The inner joint part is axially plungeable relative to the outer joint part, with the cage adjusting itself at half the plunging distance. The inner joint part is provided with an outer spherical stop face 79 which cooperates with an inner spherical stop face 81 at the cage.

As illustrated in the upper halves of the Figures, the tracks, if viewed in the longitudinal section, extend in the form of straight lines parallel to the axes $A_{71}$, $A_{73}$ of the outer joint part and inner joint part, which extend coaxially when the joint is in the extended condition. The center lines $M_{71}$, $M_{73}$ extend parallel to the track base through the ball centers and are not shown in the longitudinal section.

FIG. 4a, in the region of the axes, indicates by dashed lines an outer track 74' on the reverse of the inner joint part, which track demonstrates that the tracks do not extend exactly in the longitudinal direction. On the contrary, it can be seen that the center line $M_{74}$ of said track, in the radial projection, intersects the corresponding axis $A_{73}$ of the inner joint part in the central plane $E_{73}$ while forming therewith opposed angles on both sides, which angles deviate from zero but which become zero at the ends of the tracks.

In FIG. 4b, a central part of the inner joint part 73 containing the above-mentioned track 74' is completely broken away. In a radial view, it is possible to identify an inner track 72' in the outer joint part 71. The center line $M_{72}$ again, intersects the corresponding axis $A_{71}$ of the outer joint part in the central plane $E_{71}$ and, in the radial projection, forms therewith opposed angles on both sides, which angles deviate from zero. In this case, too, the angle between the track center line $M_{72}$ and the axis $A_{71}$ becomes zero at the ends of the tracks.

In all the above embodiments, the tracks in one of the joint parts, i.e. inner joint part and outer joint part, extend in the same direction relative to one another, with their angular positions being displaced across the circumference. Also, the ball tracks may extend in the form of helical lines in a constant distance from the respective axis of the outer or inner joint part in the vicinity of the central plane.

Figure 5A:
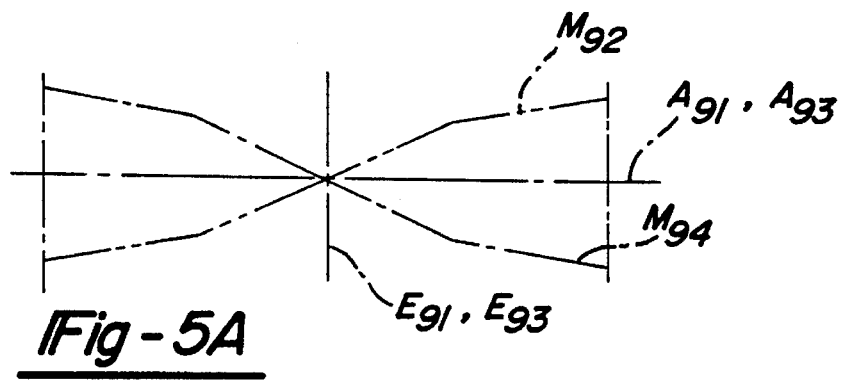
FIG. 5a shows the center lines of a pair of associated tracks in the inner and outer joint parts in a radial projection onto the central axis, with the tracks consisting of straight portions.
Figure 5B:
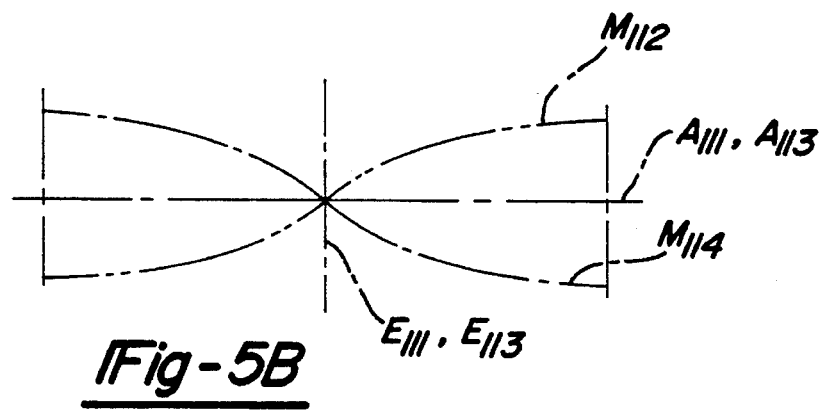
FIG. 5b shows the center lines of a pair of associated tracks in the inner and outer joint parts in a radial projection onto the central axis, with the center lines consisting of curved portions with a continuously changing curvature, for example of a hyperbola, parabola or ellipse.
Figure 5C:
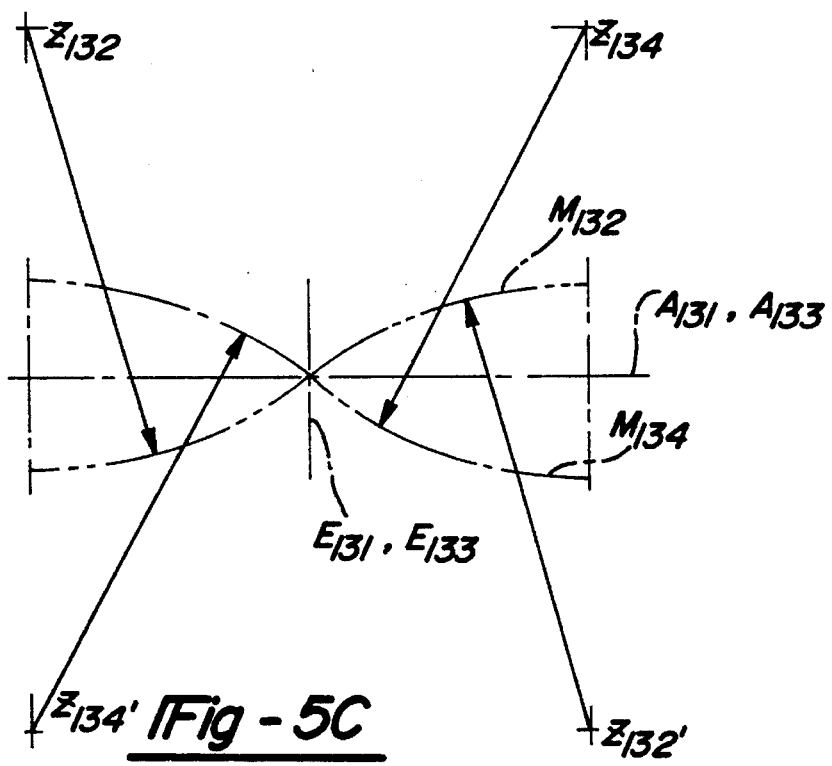
FIG. 5c shows the center lines of a pair of associated tracks in the inner and outer joint parts in a radial projection onto the central axis, with the center lines consisting of circular arches.

In FIGS. 5a to 5c, the central axes $A_{91}$, $A_{111}$, $A_{131}$ and the central planes $E_{91}$, $E_{111}$, $E_{133}$ of an outer joint part and the central axes $A_{93}$, $A_{113}$, $A_{133}$ and the central planes $E_{93}$, $E_{113}$, $E_{133}$ of an inner joint part are shown in coaxial or coinciding positions, whereas the respective joint parts are only indicated by lateral edges marked by dashed lines. In a radial projection onto the central axes, there are illustrated the center, lines $M_{92}$, $M_{94}$, $M_{112}$, $M_{114}$ and $M_{132}$, $M_{134}$ of associated tracks in the outer and inner joint parts, which jointly accommodate a ball.

In FIG. 5a, the center lines extend in the form of straight portions which are symmetric relative to one another. The center lines are symmetrical about the central axis and also symmetrical about the central plane. The portions directly adjoining the two sides of the central planes each form an angle with the axes, which angle is greater than that formed by the portions positioned towards the ends of the tracks, the angle formed by the latter portions and the axes being clearly smaller but still deviating from zero.

In FIG. 5b, the center lines $M_{112}$, $M_{114}$ of associated tracks extend in the form of curves with a continuously changing curvature such as a hyperbolic, parabolic or elliptical function. In this case, too, the angles between the center lines and axes in the immediate vicinity of the central planes are greater than the angles at the ends of the tracks.

FIG. 5c shows the center lines $M_{132}$, $M_{134}$ of associated tracks which includes circular portions, the centers of the respective circular portions of the center line $M_{132}$ having been given the reference symbols $Z_{132}$ and $Z_{132}$, and the centers of the circular portions of the center line $M_{134}$ having been given the reference symbols $Z_{134}$ and $Z_{134}$. Thus, the curvature follows a circular function. Again, the angle between the center line and the axes is greater in the immediate vicinity of the central planes than at the ends of the tracks.

While the above detailed description describes the preferred embodiments of the present invention, the invention is susceptible to modification, variation, and alteration without deviating from the scope and fair meaning of the subjoined claims.

I claim:

1. A constant velocity universal ball joint comprising;

an outer joint part with circumferentially distributed, substantially longitudinally extending inner ball tracks;

an inner joint part with circumferentially distributed, substantially longitudinally extending outer ball tracks, said inner and outer ball tracks arranged in pairs and positioned opposite one another each jointly accommodating a torque transmitting ball and participating in controlling the balls towards the angle-bisecting plane when the rotational axes of the outer joint part and inner joint part are articulated relative to one another, and a cage having circumferentially distributed windows to accommodate said balls in a common plane (E) and which said cage guides said balls to the angle-bisecting plane when the rotational axes of the outer joint part and inner joint are articulated relative to one another, wherein said inner ball tracks and said outer ball tracks are designed in such a way that, with coaxial rotational axes of said inner and outer joint parts and corresponding central planes of said inner and outer joint parts, the center lines of said pairs of said inner ball tracks and said outer ball tracks and straight lines parallel to said rotational axes of said inner and outer joint parts intersecting said center lines form respective angles relative to one another said respective angles deviating from zero and decreasing with respect to one another towards the axial ends of said ball tracks on both sides of the respective central planes.

2. A joint according to claim 1, wherein said angles between said center lines of said pairs of ball tracks and said straight lines parallel to said rotational axes with respect to one another changes continuously as a function of axial length of said center lines.

3. A joint according to claim 1, wherein said angles between said center lines of said pairs of ball tracks associated with one another and said straight lines mirror-symmetrically relative to said rotational axes.

4. A joint according to claim 1, wherein said angles between said center lines of the ball tracks in said outer joint part or in said inner joint part and said straight lines, on either side of said corresponding central planes starting from the central planes initially follow a hyperbolic function.

5. A joint according to claim 1, wherein said angles between said center lines of the ball tracks in said outer joint part or in said inner joint part and said straight lines, on either side of said corresponding central planes starting from the central planes initially follow a parabolic function.

6. A joint according to claim 1, wherein said angles between said center lines of the ball tracks in said outer joint part or in said inner joint part and said straight lines, on either side of said corresponding central planes starting from the central planes initially follow an elliptical function.

7. A joint according to claim 1, wherein said angles between said center lines of the ball tracks in said outer joint part or in said inner joint part and said straight lines, on either side of said corresponding central planes starting from the central planes initially follow a circular function.

8. A joint according to claim 1, wherein the center lines of said ball tracks extend in the form of helical lines at a constant distance from the respective axis of the outer or inner joint part in the vicinity of the central planes.

9. A joint according to claim 1, wherein the center lines of said ball tracks extend in the form of straight lines in the vicinity of the central planes, as tangent tracks.

10. A joint according to claim 1, wherein, when viewed in a longitudinal section, the center lines of the ball tracks extend in a circular arch whose center of curvature in each case is positioned in the central plane.

11. A joint according to claim 1, wherein when viewed in a longitudinal section, the center lines of the ball tracks are correspondingly curved such that the ball tracks are axially undercut-free.

12. A joint according to claim 1, wherein when viewed in a longitudinal section, the center lines of the ball tracks are parallel to said axes of said outer and inner joint part.

* * * * *